United States Patent [19]
Trenz

[11] Patent Number: 5,628,364
[45] Date of Patent: May 13, 1997

[54] CONTROL SYSTEM FOR GOVERNING IN-SITU REMOVAL OF SUBTERRANEAN HYDROCARBON-BASED FLUIDS

[75] Inventor: James W. Trenz, Norwell, Mass.

[73] Assignee: Terrane Remediation, Inc., Situate, Mass.

[21] Appl. No.: 566,710

[22] Filed: Dec. 4, 1995

[51] Int. Cl.$^6$ .............. E21B 43/12; E21B 44/00; E21B 47/10; E21B 49/00

[52] U.S. Cl. .............. 166/53; 166/66; 166/246; 166/250.03; 166/250.15; 166/370; 405/128

[58] Field of Search .............. 588/249; 405/128, 405/129; 166/53, 66, 246, 250.03, 250.15, 370

[56] References Cited

U.S. PATENT DOCUMENTS

| | | | |
|---|---|---|---|
| 4,396,149 | 8/1983 | Hirsch | 239/63 |
| 4,567,563 | 1/1986 | Hirsch | 364/420 |
| 4,660,639 | 4/1987 | Visser et al. | 166/370 X |
| 4,670,148 | 6/1987 | Schneider | 405/129 X |
| 4,846,934 | 7/1989 | Carburry | 202/177 |
| 4,966,654 | 10/1990 | Carburry | 202/177 |
| 5,017,289 | 5/1991 | Ely et al. | 405/128 X |
| 5,133,625 | 7/1992 | Albergo | 405/263 |
| 5,180,013 | 1/1993 | Abdul | 166/370 |
| 5,277,518 | 1/1994 | Billings et al. | 405/128 |
| 5,325,795 | 7/1994 | Nelson et al. | 405/128 X |
| 5,341,877 | 8/1994 | Abdul et al. | 166/272 |
| 5,445,474 | 8/1995 | Lundegard et al. | 405/128 |

Primary Examiner—George A. Suchfield
Attorney, Agent, or Firm—Sullivan & Worcester LLP

[57] ABSTRACT

There is provided a bio-remediation system and a method associated therewith for remediating a spilled hydrocarbon-based fluid from soil effectively and without causing migration of the fluid to previously uncontaminated areas. The bio-remediation system removes hydrocarbon-based fluid from a subterranean location using microbes which are immersed in a nutrient-rich medium. The microbes biologically remediate the hydrocarbon-based fluid by consuming the hydrocarbon-based fluid. The bio-remediation system ensures that the microbes and the nutrient-rich medium do not extend below the water table thus producing further contamination by monitoring moisture levels and levels of respiratory gases in the soil. When the microbes descend too deep, an air pump is actuated to dry a buffer zone between the water table and the spilled hydrocarbon-based fluid, thus halting progression of the microbes in the nutrient-rich medium.

16 Claims, 4 Drawing Sheets

CONTROL SYSTEM FOR GOVERNING IN-SITU REMOVAL OF SUBTERRANEAN HYDROCARBON-BASED FLUIDS

BACKGROUND OF THE INVENTION

This invention relates to control systems for governing in situ removal of a hydrocarbon-based fluid from soil contaminated with the fluid and, in particular, for governing removal of the fluid by bio-remediation without endangering ground water supplies.

Relatively recently, environmental concerns over introduction of hydrocarbon-based fluids, such as solvents, gasoline, diesel fuel and oils for example, into the environment have escalated. This concern is primarily due to a better understanding of the detrimental effects that the hydrocarbon-based fluids have, both directly on botanical life and indirectly on animal life by contaminating ground water supplies, inter alia. Various methods for cleaning up sites contaminated with hydrocarbon-based fluids have been developed remedy the problem.

Current methods include removal of the soil to areas that are less affected by such contamination, in situ removal of the fluid from the subsurface, and bio-remediation. Problems with removal of the soil are readily apparent. There is great expense in removing and replacing soil which is often around or under an existing edifice. Further, dumping areas which are willing to accept contaminated soil continuously dwindle in number and increase in cost.

The practice of in situ removal of the fluid from the soil subsurface is a more recent development. Current methods include boring a well into the subsurface and either recovering a portion of the hydrocarbon-based fluids by skimming, or pumping groundwater out from below the hydrocarbon-based fluids to cause some portion of the hydrocarbon-based fluids to collect in previously uncontaminated regions and then pumping the hydrocarbon-based fluids out. Another method involves intercepting the hydrocarbon-based fluids in a trench or drain constructed at a level below the spilled fluid. These three methods are typically ineffective and cause further spread of the contaminants through the subsurface of the soil. Often they result in a portion of the hydrocarbon-based fluids remaining trapped in soil and groundwater.

Further, such problems are compounded in the case where the contamination is with a viscous hydrocarbon-based fluid. In this case, the first method could lead to isolation of the fluid from the well, rendering the well useless for further recovery of fluid from a contaminated zone. The second method induces the flow of fluid into the zone previously occupied by groundwater. This spreads the spilled fluid downward and establishes new equilibrium conditions in the region. While this permits some spilled fluid to be removed, additional removal requires the sequence be repeated so that the spilled fluid is driven to deeper and more extensive regions of the subsurface. A large volume of the spilled fluid will remain trapped as residual saturation in the new regions of contamination, significantly reducing the portion able to be recovered and requiring treatment of a large volume of contaminated water.

Bio-remediation is a more recent alternative. In bio-remediation, microbes are dispersed in a nutrient rich medium throughout the contaminated site. As the microbes penetrate subsurface due to gravity forces acting thereon, they consume the hydrocarbon-based fluid transforming the hydrocarbon-based fluids into an environmentally harmless by-product. A problem with bio-remediation is that the nutrient rich medium required for the microbes to thrive is itself hazardous to ground-water supplies.

To deal with this problem, an air pump is used to evacuate environmental gases and moisture from below the furthest depth of contamination. Drawing out the gases and the moisture creates a barrier to further penetration of the nutrient rich medium and microbes. This solution brings with it an additional problem. The air pump is left on twenty-four hours a day for weeks if not months. The air pump can not be turned off or else the barrier may be penetrated.

Therefore, what is needed is a method for the recovery of a spilled fluid which is capable of removing the spilled fluid from soil in situ, while at the same time preventing the spread of the spill.

Accordingly, it is an object of this invention to biologically remediate spilled hydrocarbon-based fluids from a site without contaminating groundwater.

It is another object of this invention to remediate spilled hydrocarbon-based fluids from a site without spreading the hydrocarbon-based fluids to other locations.

It is still another object of this invention to biologically remediate spilled hydrocarbon-based fluids from a site while conserving energy and lowering costs.

These and other objects of the invention will be obvious and appear hereinafter.

SUMMARY OF THE INVENTION

The aforementioned and other objects of the invention are achieved by the invention which provides a bio-remediation system and a control system therefor. There is provided a method and an apparatus for removing a spilled hydrocarbon-based fluid from soil effectively and without causing migration of the fluid to previously uncontaminated areas. The bio-remediation system removes hydrocarbon-based fluid from a subterranean location having a water table defined therein. Microbes, when in the presence of a nutrient-rich medium, biologically remediate the hydrocarbon-based fluid by consuming the hydrocarbon-based fluid. The bio-remediation system ensures that the microbes and the nutrient-rich medium do not extend below the water table thus producing further contamination. The bio-remediation system comprises a shaft, a plurality of moisture sensors gas sensing means, an air pump, one or more fluid pumps and, in one embodiment, processing means.

The shaft is bored from the land surface into the subterranean location. The shaft is preferably placed centrally relative to the area of the spilled hydrocarbon-based fluid. The shaft has at a distal end a base.

The plurality of moisture sensors are staggered around the site to varying depths. The moisture sensors are adapted to sense moisture in the subterranean location thus allowing an operator to track progression of the microbes in the nutrient-rich medium.

A gas sensing means is disposed at the base of the shaft. The gas sensing means measures one or more respiratory gases from environmental gases which are drawn into the base of the shaft. The respiratory gases are either oxygen or carbon dioxide since a level of presence of either of these gases is directly proportional to an amount of living microbes in the soil.

The air pump located at the land surface extends into the shaft to create a vacuum therein. The vacuum draws the environmental gases and the moisture from the base of the shaft past the gas sensing means allowing the gas sensing means to make its measurements. The air pump has an inoperative mode and an operative mode where the inoperative mode allows the microbes and nutrient-rich medium to migrate deeper into the subterranean location and the operative position draws the environmental gases and moisture into the shaft to create a moisture barrier substantially free of the microbes and nutrient-rich medium.

The one or more fluid pumps are distributed around the site for introducing the microbes and the nutrient-rich medium into the soil. Each of the one or more fluid pumps have a first mode for pumping a mixture of the microbes and the nutrient-rich medium into the subsurface location and have a second mode for discontinuing the mixture to the subsurface location.

The bio-remediation system can be automated through the processing means. The processing means is in electrical communication with the gas sensing means and the plurality of moisture sensors such that it receives measurements of moisture and the one or more respiratory gases. In response to the results of these measurements, the processing means moves the air pump between inoperative and operative positions and the one or more fluid pumps between the first mode and the second mode as appropriate.

In further aspects, the invention provides methods in accordance with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, can be more fully understood from the following description, when read together with the accompanying drawings in which.

DETAILED DESCRIPTION

Figure 1:
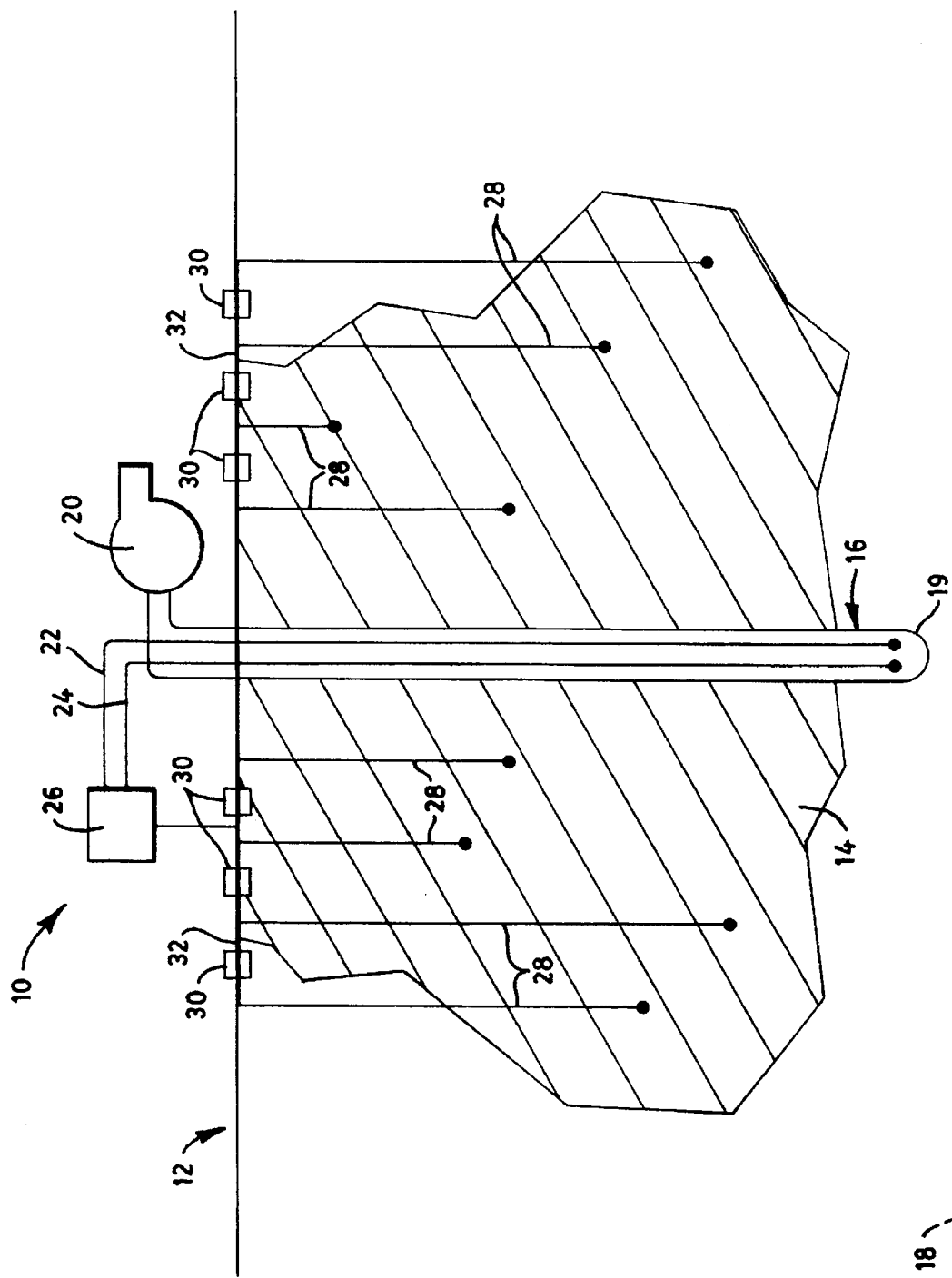
FIG. 1 is a diagram showing subsurface zones produced by the spill of a fluid and an initial placement on a bio-remediation system in accordance with the invention.

FIG. 1 illustrates is a bio-remediation system 10 installed over a tract 12 of land into which a hydrocarbon-based fluid has been introduced. The hydrocarbon-based fluid has penetrated the tract 12 to form a subsurface spill zone 14. A dashed line 18 represents a water table below which subsurface water is present.

The bio-remediation system 10 is placed approximately central to the subsurface spill zone 14. A shaft 16 is then drilled to a level extending preferably beyond the subsurface spill zone 14 but short of the water table 18. In the case that the subsurface spill zone 14 has extended into the water table 18, the shaft still remains short of the water table 18 and the hydrocarbon-based fluid that is below the water table is left to dissipate in the groundwater. A single shaft is shown in the illustrated embodiment but one skilled in the art will realize that multiple shafts are used in a large spill site and all other aspects of the bio-remediation systems 10 are then scaled accordingly.

A pipe 17 is disposed in the shaft 16 and has at its distal end 19 perforated or slotted sections open to the surrounding soil in the subsurface. In the preferred embodiment, the perforated sections each preferably consist of parallel 0.25 millimeter slots and extend along the final meter of the distal end 17.

An air pump 20 is attached to a top portion of the pipe 17 and is adapted to exert suction or a partial vacuum in the pipe 17.

Moisture sensors 28 are then inserted into the subsurface spill zone 14 at varying depths and at random radial distances and angles relative to the pipe 17. The depths are offset from neighboring moisture sensors 28 such that moisture is measured throughout the subsurface spill zone 14.

A moisture sensor 22 and a gas sensor 24 are also disposed within the pipe 17. Each sensor 22, 24 are placed at the distal end 19 of the pipe 17 to measure moisture and gas content in air drawn from the surrounding soil. The gas sensor preferably senses oxygen or carbon dioxide since these two gases are directly indicative of respiration. The usefulness of such a measurement is described hereinafter.

The moisture sensor 22 and the gas sensor 24 are electrically connected to a monitoring station 26. The monitoring station 26 contains gauges that display current sensor readings. These gauges can be electronic such as liquid crystal displays, paper recorders, or other gages well known in the art.

The monitoring station 26 also receives input from each of the moisture sensors 22 through a bus 32. The bus 32 carries data relating to the amount of moisture being sensed by each individual moisture sensor 28 such that the data can be displayed by the monitoring station 26.

Holes 30 are then bored though the surface of the tract 12 at substantially fixed angles and radial distances relative to the pipe 17. These holes 30 are adapted to receive a microbial fluid 31 containing a mixture of microbes in a nutrient-rich liquid.

Figure 2:
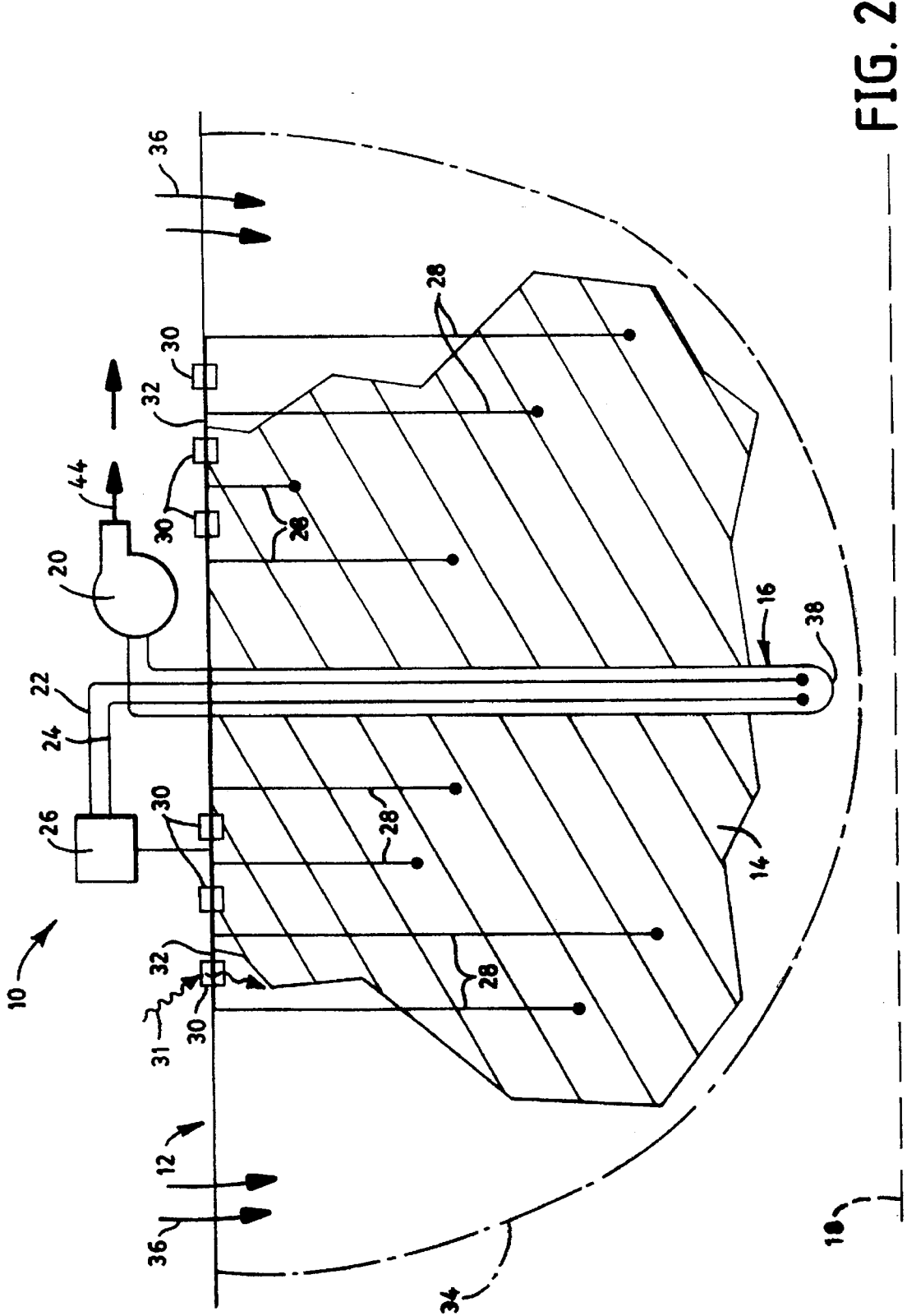
FIG. 2 is the diagram of FIG. 1 illustrating the bio-remediation system in operation.

Referring now to FIG. 2, an operator adds the microbial fluid 31 into the holes and monitors moisture levels on the monitoring station 26. The microbial fluid 31 is continuously added until the moisture sensors 22 show that the microbial fluid 31 has reached a desired depth, usually toward a bottom portion of the subsurface spill zone 14.

The air pump 20 is then activated to inhibit further progress of the microbial fluid 31. The air pump 20 draws air 36 from the surface of the tract 12 through a substantially arcuate and almost hemispherical area 34. This area is known as the area of influence. Air flow through the soil has the effect of drying the soil particularly along a perimeter of the area of influence. It is well known in the art that the area of influence can be determined by inspection by using a pressure meter to read air pressure in the soil where a substantial decrease in air pressure in the soil marks the perimeter of the area of influence. The area of influence is a function of soil permeability and, therefore, soil type such as sand, clay, et cetera, must be determined before estimating the radius of the area of influence.

The movement of air 36 through the subsurface serves to deplete moisture from the soil. A dry barrier is then formed primarily along a periphery of the substantially hemispherical area 34. Once this barrier is established, additional the microbial fluid 31 poured into the holes 30 and subsequently into the subsurface spill zone 14 without concern for contamination of the ground water below the water table 18.

The operator monitors the moisture content and the gas content of the air 36 through the moisture sensor 22 and the gas sensor 24, respectively. If the moisture content increases then the microbial fluid 31 is deemed to be penetrating the barrier and the operator discontinues input of the microbial fluid 31. If moisture levels decrease then the air pump 20 is turned off.

Turning the air pump 20 on or off based on soil moisture content has multiple beneficial implications. The most obvious being conservation of power. Another is that by knowing moisture level and depth of moisture an operator can maximize fluid penetration thereby creating a more efficient remediation process. In dry areas such as a desert, for example, or a remote location, conservation of subsurface moisture avoids depletion of the microbial fluid 31 thus decreasing a cost of remediation.

The gas sensor 24 provides data relative to respiration of the microbes. Oxygen levels decrease and carbon dioxide levels increase proportional to a quantity on living microbes in the surrounding soil. The fluctuation of these gas levels are due to respiration of the microbes in the microbial fluid 31 and are measured relating to a gas sample taken before the introduction of the microbial fluid 31 into the soil.

Figure 3:
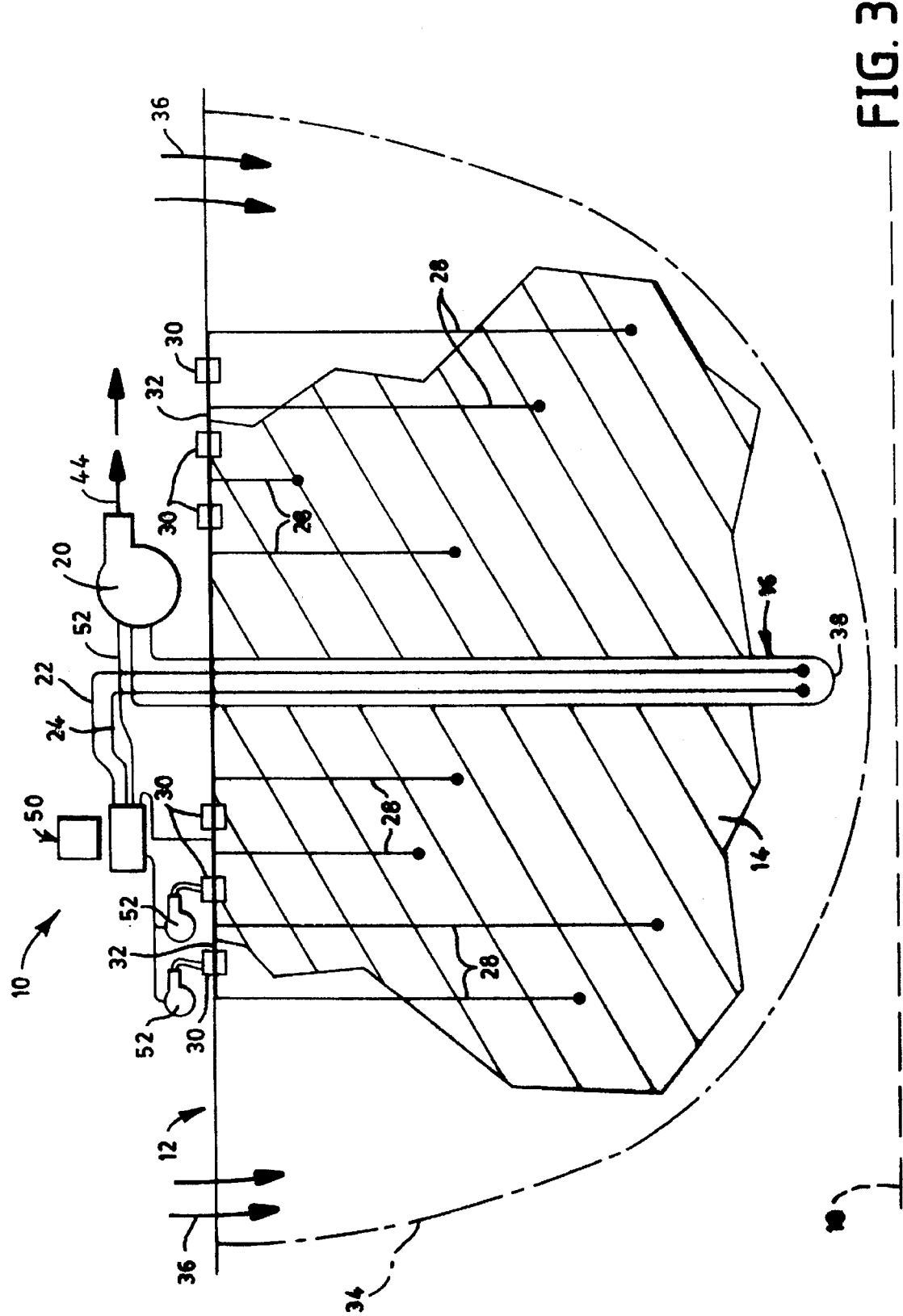
FIG. 3 is the diagram of FIG. 2 having a computer inserted therein for automatic control.

The infiltration of the microbial fluid 31 into the subsurface spill zone 14 can take days and the digestive process of the hydrocarbon-based fluid that contaminated the subsurface spill zone 14 can take months. For this reason it is advantageous to automate the control process performed by the operator. FIG. 3 shows a computer 50 displacing the monitoring station 26 as the data collector.

Figure 4:
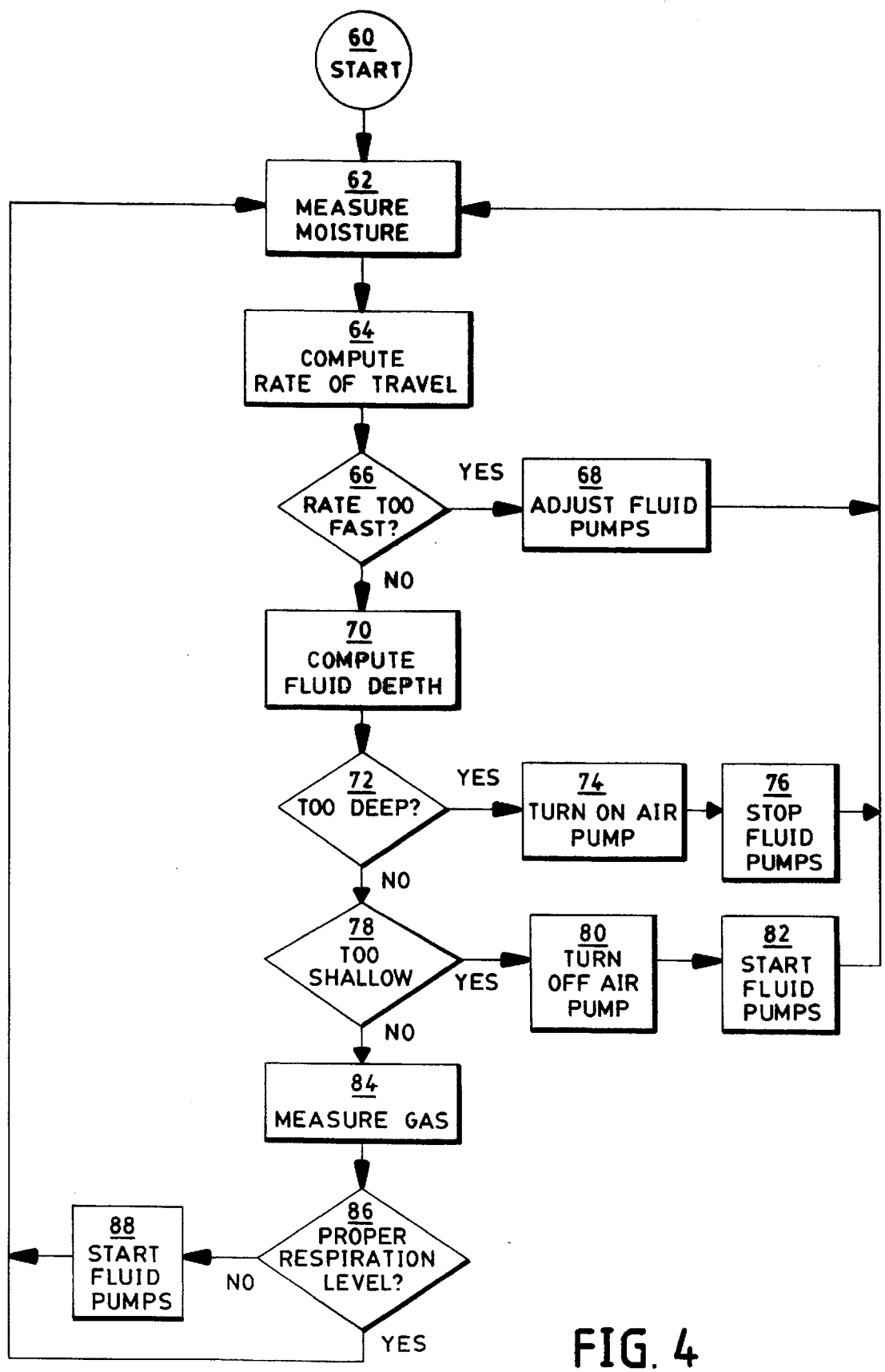
FIG. 4 is a block diagram of the steps taken by the computer control system of FIG. 3.

The computer 50 receives inputs from the moisture sensors 28 along with the moisture sensor 22 and the gas sensor 24. The computer 50 analyzes the data from the sensors 22, 24, 28 according to the flow chart of FIG. 4.

Once the start 60 command is received to initiate computer control of the bio-remediation system 10, moisture measurements are read 62 from each of the moisture sensors 28. Since the moisture sensors 28 are at varying depths and those depths are known, a rate of moisture travel can then be computed 64. The rate of moisture travel will vary depending on soil constitution. For example, the microbial fluid 31 will pass through sandy soil faster than clay. The computer 50 can then ensure even distribution of the microbial fluid 31 throughout the subsurface spill zone 14 determining which areas have a flow rate that is excessive 66 and by slowing flow of the microbial fluid 31 in those areas by adjusting the fluid pump output 68.

Slowing the flow 68 of the microbial fluid 31 is achieved by controlling fluid pumps 52 which are pumping the microbial fluid 31 into the holes 30. In the figure, each hole has an associated fluid pump 52 that is controlled by the computer 50 even though some have been omitted to simplify the illustration.

The penetration depth of the microbial fluid 31 is then computed 70 and the computer 50 determines whether the microbial fluid 31 is approaching the bottom of the subsurface spill zone 72. If the microbial fluid 31 has penetrated too deep 72 then the air pump 20 is activated 74. Further, fluid flow in the regions where maximum depth has been achieved is ceased 76. As previously described, the air pump 20 then creates a barrier shielding the ground water from contamination.

If the microbial fluid 31 has not gone too deep then a check is made to see if it is too shallow 78. Too shallow would mean that the microbes are not treating the entire subsurface spill zone 14 and, thus the air pump is turned off 80 to avoid depleting the area of moisture. The fluid pumps are then turned on 82 to replenish the microbial fluid 31 to the contaminated area.

If the microbial fluid 31 is neither too shallow nor too deep then the density of microbes must be checked. This is done by measuring the respiratory gas content 84 in the air 36 that has passed through the subsurface spill zone 14. If inadequate respiration levels exist 86 then the fluid pumps are turned on 88 to introduce more microbial fluid 31 with additional microbes and the nutrient rich liquid into the soil. If the respiration levels are proper 86 then the cycle of measurement and control is repeated.

In practice, the above control procedure through either manual of computer controlled operation has served to decrease power consumption by the pumps and increased a rate of consumption of the hydrocarbon-based fluid by the microbes.

Advantageously, the recovery method of the invention may be used with surfactant clean-up techniques. As a result, a spill site is restored to virtually its original condition without disturbance of subsurface medium and groundwater.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

The embodiments of the invention in which an exclusive property or privilege is claimed are defined as follows:

1. A bio-remediation system for removing of hydrocarbon-based fluid from a subterranean location having a water table defined therein, the hydrocarbon-based fluid being biologically remediable by microbes which consume the hydrocarbon-based fluid when in the presence of a nutrient-rich medium, the bio-remediation system ensuring that the nutrient-rich medium does not extend below the water table, the bio-remediation system comprising a shaft bored from a land surface into the subterranean location and having a base disposed at a distal end of the shaft;

a plurality of moisture sensors adapted to sense moisture in the subterranean location where the plurality of moisture sensors are placed at varying depths relative to the land surface and the plurality of moisture sensors are adapted to produce a moisture signal indicative of a quantity of the moisture;

gas sensing means disposed at the base of the shaft for measuring one or more respiratory gases from environmental gases, the gas sensing means being adapted to produce a gas signal indicative of a quantity of the one or more respiratory gases;

an air pump disposed at the land surface and extending into the shaft to create a vacuum therein such that the environmental gases and the moisture are drawn from the base of the shaft, the air pump having an inoperative mode and an operative mode where the inoperative mode allows the microbes and nutrient-rich medium to migrate deeper into the subterranean location and the operative position draws the environmental gases and moisture into the shaft to create a moisture barrier substantially free of the microbes and nutrient-rich medium; and processing means in electrical communication with the plurality of moisture sensors, the gas sensing means and the air pump to switch the air pump between the operative position and the inoperative position in response to the plurality of the moisture signal and the gas signal.

2. The bio-remediation system according to claim 1 further comprising one or more fluid pumps in electrical communication with the processing means where each of the one or more fluid pumps have a first mode for pumping a mixture of the microbes and the nutrient-rich medium into the subsurface location and have a second mode for discontinuing the mixture to the subsurface location, the one or more fluid pumps being switchable between the first mode and the second mode by the processing means in response to the plurality of the moisture signal and the gas signal.

3. The bio-remediation system according to claim 1 further comprising processing means in electrical communication with the gas sensing means and the plurality of moisture sensors for receiving measurements of moisture and the one or more constituent gases and for moving the air pump between inoperative and operative positions in response thereto.

4. The bio-remediation system according to claim 3 further comprising one or more fluid pumps where each of the one or more fluid pumps have a first mode for pumping a mixture of the microbes and the nutrient-rich medium into the subsurface location and have a second mode for discontinuing the mixture to the subsurface location and the processing means is adapted to control movement of the one or more fluid pumps between the first and second modes in response to analysis of the measurements of moisture and the one or more constituent gases.

5. The bio-remediation system according to claim 1 wherein the plurality of moisture sensors are varied in distance relative to the shaft.

6. The bio-remediation system according to claim 1 wherein the plurality of moisture sensors are varied in angle relative to the shaft.

7. The bio-remediation system according to claim 1 wherein the air pump is operable to remove moisture and gases from the subsurface location via the shaft such that a substantially arcuate-shaped buffer zone is created around an area of the subsurface location contaminated by the hydrocarbon-based fluid.

8. The bio-remediation system according to claim 7 wherein the buffer zone is substantially hemispherical with the shaft forming a radius of the hemisphere.

9. The bio-remediation system according to claim 1 wherein a depth of each of the plurality of moisture sensors is known and a time measured between detection of an increase in moisture level at an upper moisture sensor and detection of a corresponding increase in moisture level at a lower moisture sensor is directly proportional to a speed of advancement of the microbes in the nutrient-rich medium.

10. The bio-remediation system according to claim 1 wherein an amount of respiratory gases measured by the gas sensing means is directly proportional to amount of living microbes in the buffer zone.

11. The bio-remediation system according to claim 10 wherein the respiratory gas is oxygen.

12. The bio-remediation system according to claim 10 wherein the respiratory gas is carbon dioxide.

13. A computer controlled bio-remediation system for removing of hydrocarbon-based fluid from a subterranean location having a water table defined therein, the hydrocarbon-based fluid being biologically remediable by microbes which consume the hydrocarbon-based fluid when in the presence of a nutrient-rich medium, the bio-remediation system ensuring that the nutrient-rich medium does not extend below the water table, the bio-remediation system comprising a shaft bored from a land surface into the subterranean location and having a base disposed at a distal end of the shaft;

a plurality of moisture sensors adapted to sense moisture in the subterranean location where the plurality of moisture meters are placed at varying depths relative to the land surface where each of the plurality of moisture sensors transmits a moisture signal representative of a measurement of the moisture;

gas sensing means for measuring one or more respiratory gases from in the subterranean location and for producing gas level signals representative of the measurement of the one or more respiratory gases;

an air pump disposed at the land surface and extending into the subterranean location to create a vacuum therein such that environmental gases and the moisture are drawn therefrom, the air pump having an inoperative mode and an operative mode where the inoperative mode allows the microbes and nutrient-rich medium to migrate deeper into the subterranean location and the operative position draws the environmental gases and moisture into the shaft to create a moisture barrier substantially free of the microbes and nutrient-rich medium; and processing means in electrical communication with the plurality of moisture sensors, the gas sensing means and the air pump to control the penetration of the microbes and nutrient-rich medium into the subterranean location by switching the air pump between the operative mode and the inoperative mode in response to each of the moisture signals and the gas signals.

14. The bio-remediation system according to claim 13 further comprising one or more fluid pumps where each of the one or more fluid pumps have a first mode for pumping a mixture of the microbes and the nutrient-rich medium into the subsurface location and have a second mode for discontinuing the mixture to the subsurface location where the processing means switches the one or more fluid pumps between the first mode and the second mode in response to each of the moisture signals and the gas signals.

15. The bio-remediation system according to claim 14 wherein a depth of each of the plurality of moisture sensors is known and the processing means calculates a rate of descent of the mixture to control an mount of time that the one or more fluid pumps are in the first mode.

16. The bio-remediation system according to claim 13 wherein the processor controls an amount of microbes in the subterranean location by using the gas signal to approximate an amount of living microbes in the buffer zone.

* * * * *